United States Patent
Kato et al.

(10) Patent No.: US 12,145,488 B2
(45) Date of Patent: Nov. 19, 2024

(54) VEHICLE SEAT, HEADREST, AND HEAD SUPPORT MEMBER

(71) Applicant: NHK SPRING CO., LTD., Yokohama (JP)

(72) Inventors: Kazuhito Kato, Yokohama (JP); Kousuke Suzuki, Yokohama (JP); Chikanori Honda, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 17/541,129

(22) Filed: Dec. 2, 2021

(65) Prior Publication Data

US 2022/0185159 A1   Jun. 16, 2022

(30) Foreign Application Priority Data

Dec. 11, 2020   (JP) .................... 2020-206120

(51) Int. Cl.
*B60N 2/853* (2018.01)
*B60N 2/80* (2018.01)
*B60N 2/829* (2018.01)
*B60N 2/865* (2018.01)

(52) U.S. Cl.
CPC .......... *B60N 2/80* (2018.02); *B60N 2002/899* (2018.02)

(58) Field of Classification Search
CPC ........... B60N 2/865; B60N 2/885; B60N 2/80
See application file for complete search history.

(56) References Cited

U.S. PATENT DOCUMENTS

| | | | | |
|---|---|---|---|---|
| 5,015,036 A | * | 5/1991 | Fergie | A47C 7/383 297/391 |
| 5,503,456 A | * | 4/1996 | Rossini | A47C 7/425 224/586 |
| D396,291 S | * | 7/1998 | Bakes | D6/601 |

(Continued)

FOREIGN PATENT DOCUMENTS

| | | |
|---|---|---|
| CN | 101973221 B | 8/2012 |
| CN | 105691260 A | 6/2016 |

(Continued)

OTHER PUBLICATIONS

Extended European Search Report dated May 11, 2022, in European Patent Application No. 21211999.4 in 8 pages.

(Continued)

*Primary Examiner* — Shin H Kim
(74) *Attorney, Agent, or Firm* — KNOBBE, MARTENS, OLSON & BEAR LLP

(57) ABSTRACT

A vehicle seat includes a seat cushion, a seatback, a headrest, and a head support section. The seat cushion is configured so as to support the buttocks of a seated occupant from a seat lower side. The seatback is configured so as to support the back of the seated occupant from a seat rear side. The headrest is configured so as to support the head of the seated occupant from the seat rear side. The head support section is provided to the headrest and is configured so as to support a location corresponding the occipital bone of the head of the seated occupant from a seat left-right direction, and is also configured so as to support the location in a forward direction and in a seat obliquely upward direction from the seat rear side.

7 Claims, 14 Drawing Sheets

(56) References Cited

U.S. PATENT DOCUMENTS

| | | | |
|---|---|---|---|
| D399,080 S * | 10/1998 | Morrison | D6/716.5 |
| D420,408 S * | 2/2000 | Santimaw | D6/601 |
| 6,123,389 A | 9/2000 | O'Connor et al. | |
| 6,158,812 A * | 12/2000 | Bonke | B60N 2/818 |
| | | | 297/216.12 |
| D543,066 S * | 5/2007 | Ohno | D6/601 |
| 7,628,456 B1 * | 12/2009 | Swartz | A47C 7/383 |
| | | | 297/464 |
| 8,007,045 B2 * | 8/2011 | Meiller | B60N 2/885 |
| | | | 297/391 |
| D686,025 S * | 7/2013 | Blazure | D6/601 |
| RE44,432 E * | 8/2013 | Bartels | B60N 2/888 |
| | | | 297/216.12 |
| 8,573,700 B2 * | 11/2013 | Togura | B60N 2/0232 |
| | | | 297/216.12 |
| 9,211,823 B2 * | 12/2015 | Campa | B60N 2/882 |
| 10,843,607 B2 * | 11/2020 | Kondo | B60N 2/818 |
| 11,008,106 B2 * | 5/2021 | Parrilla Calle | B60N 2/888 |
| 11,445,828 B2 * | 9/2022 | Fan | A47G 9/1081 |
| 2012/0292973 A1 * | 11/2012 | Westerink | B60N 2/885 |
| | | | 297/391 |
| 2014/0375100 A1 * | 12/2014 | Reese | B60N 2/806 |
| | | | 297/391 |
| 2016/0023767 A1 * | 1/2016 | Zheng | B64D 11/0647 |
| | | | 297/391 |
| 2017/0197530 A1 | 7/2017 | Line et al. | |
| 2017/0320413 A1 * | 11/2017 | Knapp | B60N 2/882 |
| 2018/0281638 A1 | 10/2018 | Chu | |
| 2019/0359105 A1 | 11/2019 | Kondo et al. | |
| 2020/0055483 A1 * | 2/2020 | Rao | B60R 22/001 |
| 2020/0077820 A1 * | 3/2020 | Lowry | A47G 9/1027 |
| 2020/0346758 A1 * | 11/2020 | Parrilla Calle | B60N 2/856 |
| 2021/0337970 A1 * | 11/2021 | Fan | A47G 9/1081 |
| 2023/0000255 A1 * | 1/2023 | Sin | A47C 7/383 |

FOREIGN PATENT DOCUMENTS

| | | |
|---|---|---|
| CN | 110691735 A | 1/2020 |
| JP | 2007-000257 A | 1/2007 |
| JP | 3146000 U | 10/2008 |
| JP | 2020-059349 A | 4/2020 |
| KR | 20-0311908 Y1 | 4/2003 |

OTHER PUBLICATIONS

Notice of Reasons for Refusal issued in Japanese Application No. 2020-206120, dated Dec. 12, 2023.

Chinese Office Action issued in the corresponding Chinese Patent Application No. 202111451550.1, dated Apr. 19, 2023 in 18 pages including English translation.

* cited by examiner

VEHICLE SEAT, HEADREST, AND HEAD SUPPORT MEMBER

CROSS-REFERENCE TO RELATED APPLICATION

This application is based on and claims priority under 35 USC 119 from Japanese Patent Application No. 2020-206120 filed on Dec. 11, 2020, the disclosure of which is incorporated by reference herein.

BACKGROUND

Technical Field

The present disclosure relates to a vehicle seat, a headrest, and a head support member.

Related Art

Japanese Patent Application Laid-Open (JP-A) No. 2020-59349 discloses a vehicular seat including a mechanism to suppress occupant travel sickness. A headrest of the vehicular seat described in this document includes a main section that supports a rear surface of the head of an occupant, a left side section that is connected to a left edge of the main section so as to be capable of rotating with its axial direction along an up-down direction, and a right side section that is connected to a right edge of the main section so as to be capable of rotating with its axial direction along the up-down direction. The headrest also includes a left drive device that rotates the left side section toward the front with respect to the main section, and a right drive device that rotates the right side section toward the front with respect to the main section. In cases in which acceleration toward the left side has occurred, the left side section is rotated toward the front by the left drive device, such that movement of the head of the occupant toward the left side is restricted by the left side section. Similarly, in cases in which acceleration toward the right side has occurred, the right side section is rotated toward the front by the right drive device, such that movement of the head of the occupant toward the right side is restricted by the right side section. The posture of the head of the occupant is controlled in this manner, such that occupant travel sickness is suppressed.

Although the configuration disclosed in JP-A No. 2020-59349 is beneficial from the perspective of suppressing occupant travel sickness, a mechanism with a complex configuration is required in order to rotate parts of the headrest in response to acceleration toward the left and right sides.

SUMMARY

In consideration of the above circumstances, an object of the present disclosure is to obtain a vehicle seat, a headrest, and a head support member that are capable of suppressing occupant travel sickness while suppressing the configuration from becoming complex.

A vehicle seat of a first aspect includes: a seat cushion configured so as to support buttocks of a seated occupant from a seat lower side: a seatback configured so as to support a back of the seated occupant from a seat rear side; a headrest configured so as to support a head of the seated occupant from the seat rear side; and a head support section provided at the headrest, the head support section being configured to support a location corresponding an occipital bone of the head of the seated occupant from a seat left-right direction, and also being configured to support the location in a forward direction and in a seat obliquely upward direction from the seat rear side.

In the vehicle seat of the first aspect, the buttocks, back, and head of the seated occupant are respectively supported by the seat cushion, the seatback, and the headrest. The location corresponding the occipital bone of the head of the seated occupant is supported from the seat left-right direction and is also supported in the forward direction and in the seat obliquely upward direction from the seat rear side by the head support section. The head of the seated occupant is thereby effectively suppressed from rocking, such that travel sickness of the seated occupant is suppressed. In this manner, travel sickness of the seated occupant can be suppressed using a simple configuration in which the head support section is provided.

A vehicle seat of a second aspect is the vehicle seat of the first aspect, wherein a shape and a dimension of the head support section are set such that contact pressure between the head support section and a first location corresponding to the occipital bone of the head of the seated occupant increases in a case in which acceleration in a seat rightward direction has acted on the seated occupant, and such that contact pressure between the head support section and a second location corresponding to the occipital bone of the head of the seated occupant and at a same height as the first location increases in a case in which acceleration in a seat leftward direction has acted on the seated occupant.

In the vehicle seat of the second aspect, the contact pressure between the head support section and the first location corresponding to the occipital bone of the head of the seated occupant increases when acceleration in the seat rightward direction acts on the seated occupant. Similarly, the contact pressure between the head support section and the second location corresponding to the occipital bone of the head of the seated occupant increases when acceleration in the seat leftward direction acts on the seated occupant. Thus increasing the contact pressure between the head support section and the first location and second location that are locations corresponding to the occipital bone of the head of the seated occupant and are at the same height as each other enables the head of the seated occupant to be effectively suppressed from rocking.

A vehicle seat of a third aspect is the vehicle seat of the first aspect, wherein a shape and a dimension of the head support section are set such that the head of the seated occupant is supported further toward a rear side than a mastoid process.

In the vehicle seat of the third aspect, setting the shape and dimension of the head support section in the above manner enables support of the head by the head support section to be withdrawn in cases in which the upper body of the seated occupant is greatly offset from seat center.

A vehicle seat of a fourth aspect is the vehicle seat of the first aspect, wherein: the headrest includes: a headrest body, and the head support section supported by the headrest body; and the head support section is capable of being displaced between a state of being stowed in the headrest body and a state of projecting toward a seat front side with respect to the headrest body.

In the vehicle seat of the fourth aspect, the head support section is capable of being displaced between the state stowed in the headrest body and the state projecting toward the seat front side with respect to the headrest body. This enables the head support section to be stowed in the headrest body when the head support section is not required.

A headrest of a fifth aspect includes a headrest body configured so as to support a head of a seated occupant from a seat rear side; and a head support section supported by the headrest body, the head support section being configured to support a location corresponding an occipital bone of the head of the seated occupant from a seat left-right direction, and also being configured to support the location in a forward direction and in a seat obliquely upward direction from the seat rear side.

In the headrest of the fifth aspect, the head of the seated occupant in the vehicle seat is supported by the headrest body. The location corresponding the occipital bone of the head of the seated occupant is supported from the seat left-right direction and is also supported in the forward direction and in the seat obliquely upward direction from the seat rear side by the head support section. The head of the seated occupant is thereby effectively suppressed from rocking, such that travel sickness of the seated occupant is suppressed. In this manner, travel sickness of the seated occupant can be suppressed using a simple configuration in which the head support section is provided.

A head support member of a sixth aspect includes an attachment section configured so as to be attached to a vehicle seat; and a head support section fixed to the vehicle seat by attaching the attachment section to the vehicle seat, the head support section being configured to support a location corresponding an occipital bone of a head of a seated occupant from a seat left-right direction, and also being configured to support the location in a forward direction and in a seat obliquely upward direction from a seat rear side.

In the head support member of the sixth aspect, the head support section is fixed to the vehicle seat by attaching the attachment section to the vehicle seat. The location corresponding the occipital bone of the head of the seated occupant in the vehicle seat is supported from the seat left-right direction and is also supported in the forward direction and in the seat obliquely upward direction from the seat rear side by the head support section. The head of the seated occupant is thereby effectively suppressed from rocking, such that travel sickness of the seated occupant is suppressed. In this manner, travel sickness of the seated occupant can be suppressed using a simple configuration in which the head support member is attached to the vehicle seat.

The vehicle seat, a headrest, and a head support member according to the present disclosure exhibit excellent advantageous effects of enabling occupant travel sickness to be suppressed, while suppressing the configuration from becoming complex.

BRIEF DESCRIPTION OF THE DRAWINGS

Exemplary embodiments of the present invention will be described in detail based on the following figures, wherein.

DETAILED DESCRIPTION

Background to and Object of Development

First, explanation follows regarding the background to and object of developing a vehicle seat 10 (see FIG. 3) according to an exemplary embodiment of the present disclosure.

With the increasing presence of autonomously driven vehicles, there has been growing concern in recent years that travel sickness might become more severe when traveling in a vehicle that is being autonomously driven. Travel sickness is known to occur as a result of contradictory sensations experienced by the inner ears and eyes of an occupant when their head is rocking. It is also known that travel sickness can be alleviated by lessening the conflict between the sensations of the inner ears and eyes of the occupant. Thus, an object of development is to alleviate travel sickness by suppressing the head of the occupant from rocking, this being a cause of travel sickness.

Travel Sickness Evaluation Method

Next, explanation follows regarding a method of evaluating travel sickness.

Figure 1:
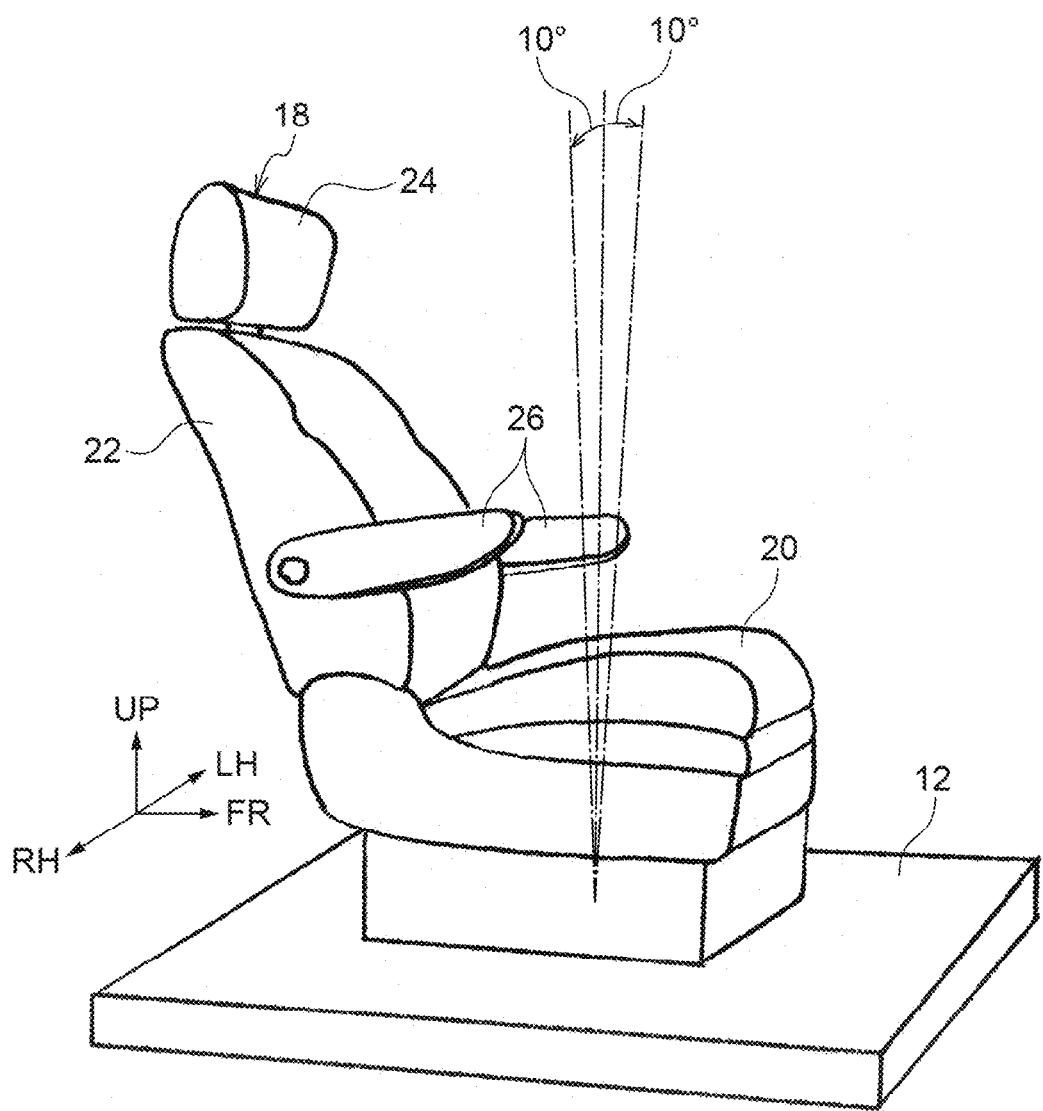
FIG. 1 is a perspective view illustrating a vehicle seat fixed onto a vibration machine.

As illustrated in FIG. 1, a travel sickness evaluation is performed by fixing a vehicle seat 18 onto a vibration machine 12, and vibrating the vibration machine 12 in a seat left-right direction in a state in which an occupant is seated on the vehicle seat 18. Note that this test is referred to as a "travel sickness evaluation test". In the drawings, the arrow FR, arrow UP, arrow RH, and arrow LH respectively indicate a seat front side, an upper side, a right side, and a left side from the perspective of an occupant seated on the vehicle seat. Unless specifically stated otherwise, simple reference to front and rear, up and down, and left and right directions refers to front and rear in a seat front-rear direction, up and down in a seat up-down direction, and left and right in the seat left-right direction.

Figure 2:
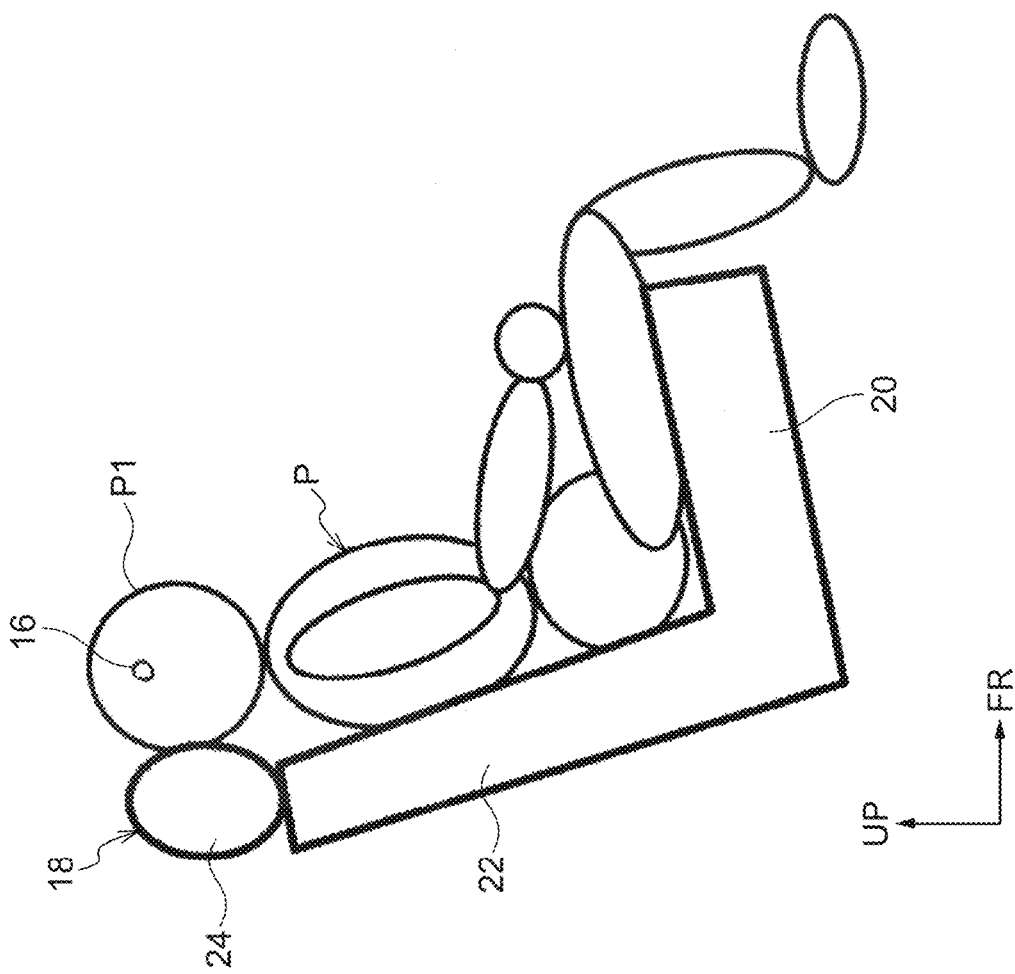
FIG. 2 is a side view illustrating a vehicle seat set to an upright position and an occupant seated in the vehicle seat.

During the travel sickness evaluation test, the vehicle seat 18 is repeatedly vibrated toward the left and right between a position tilted 10° toward the left side and a position tilted 10° toward the right side with respect to the up-down direction. The vibration frequency is 0.1 Hz, and the vibration duration is 30 minutes. The travel sickness evaluation test is performed while the vehicle seat 18 is at an upright position as illustrated in FIG. 2. Note that as an example, this upright position is a position enabling an occupant P to drive the vehicle by manual driving while seated on the vehicle seat 18. Namely, the occupant P is able to operate a steering wheel while seated on the vehicle seat 18 at this position. A brief explanation follows regarding a configuration of the vehicle seat 18. The vehicle seat 18 includes a seat cushion 20 that supports the buttocks of a seated occupant from the lower side, a seatback 22 that supports the back of the seated occupant from the rear side, and a headrest 24 that supports the head of the seated occupant from the rear side. The seatback 22 is capable of reclining in the front-rear direction with respect to the seat cushion 20. A recline angle of the seatback 22 with respect to the seat cushion 20 can be adjusted in this manner. This vehicle seat 18 according to a comparative example also includes a left and right pair of armrests 26 that are respectively supported by left and right side portions of the seatback 22 so as to be capable of swinging in the front-rear direction.

In the travel sickness evaluation test, evaluation of travel sickness is performed by sensory evaluation according to sensations felt by the occupant P.

In the sensory evaluation, a score is allocated based on sensations felt by the occupant P while the vehicle seat 18 is vibrating. Note that this score (mark) is an average value for the 30 minutes of vibration. A correspondence table between the score and occupant sensations is given below.

TABLE 1

| Score | Occupant sensations regarding travel sickness |
|---|---|
| 0 | No symptoms |
| 1 | Minor symptoms |
| 2 | Light symptoms but no nausea |
| 3 | Mild degree of nausea |
| 4 | Mild to medium degree of nausea |
| 5 | Medium degree of nausea, but able to continue vehicle travel |
| 6 | Medium degree of nausea and desire to stop vehicle travel |

Development of an Effective Vehicle Seat for Suppressing Travel Sickness

Explanation follows regarding configuration and advantageous effects of the vehicle seat 10 of the present exemplary embodiment. Note that portions of the vehicle seat 10 of the present exemplary embodiment that correspond to those of the vehicle seat 18 described previously are allocated the same reference numerals as those of the vehicle seat 18, and explanation thereof is omitted.

Configuration of Vehicle Seat 10 of Present Exemplary Embodiment

Figure 3:
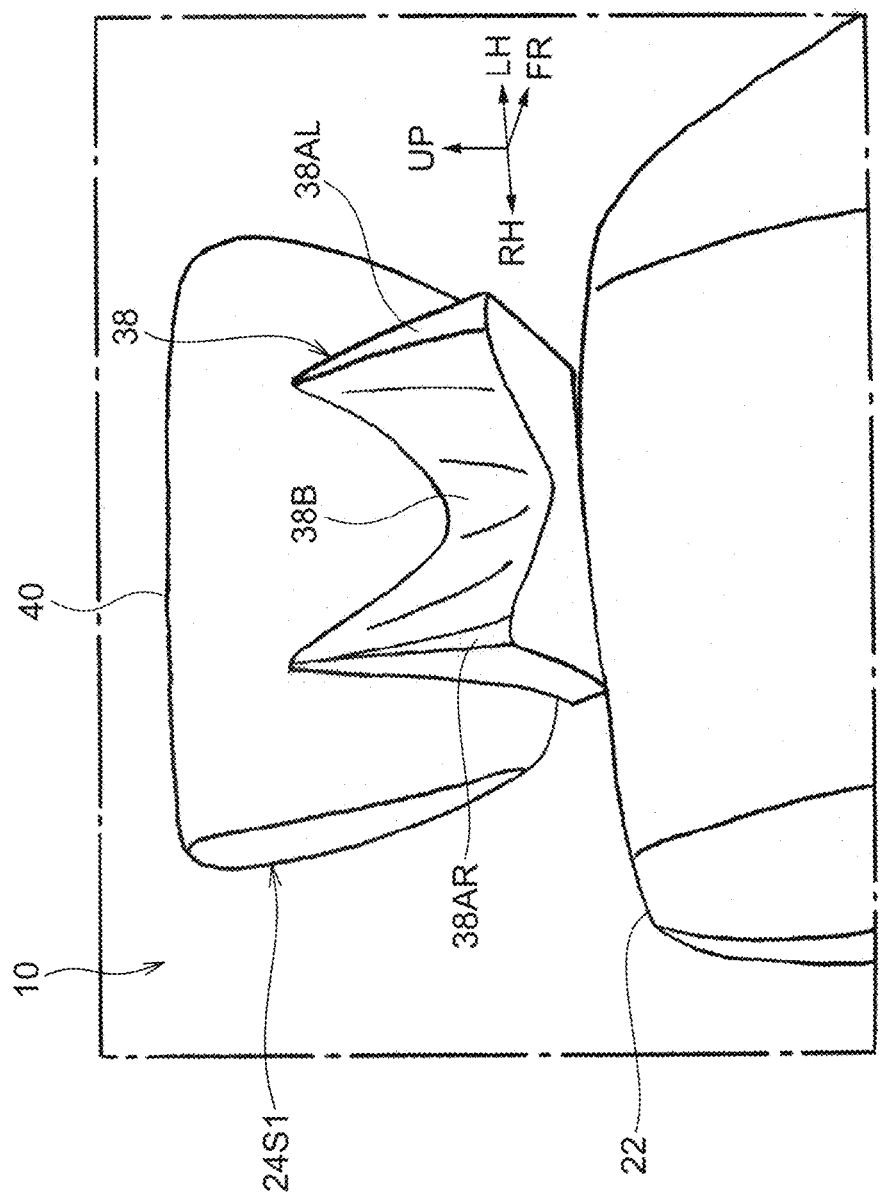
FIG. 3 is a perspective view illustrating a vehicle seat of an exemplary embodiment.
Figure 4:
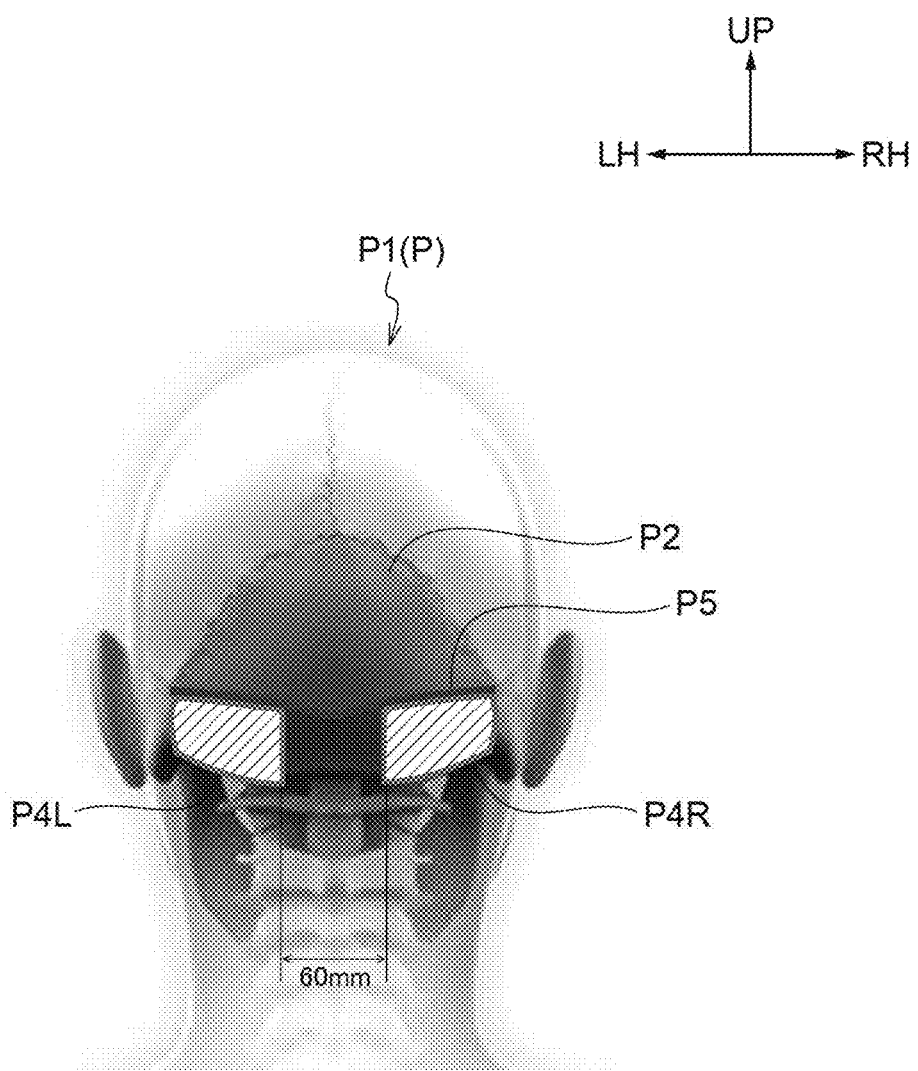
FIG. 4 is a back view of a head viewed from a rear side.
Figure 5:
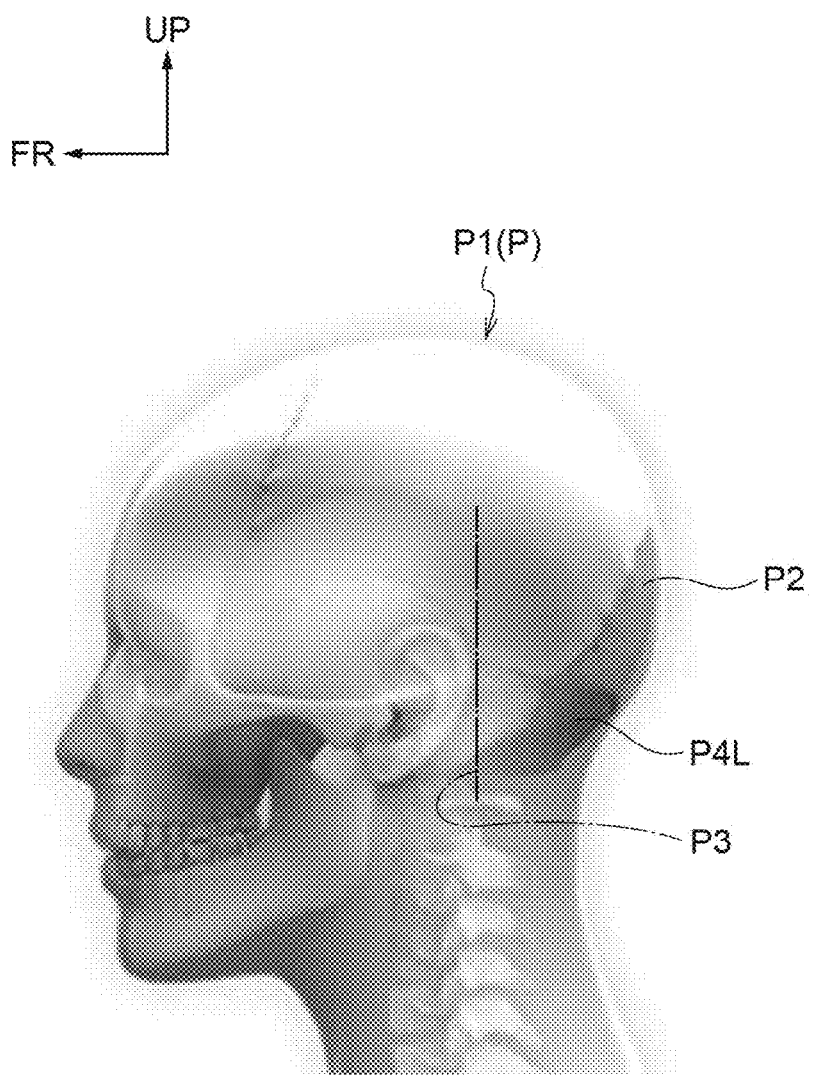
FIG. 5 is a side view of a head viewed from a left side.

As illustrated in FIG. 3, the vehicle seat 10 of the present exemplary embodiment includes a non-illustrated seat cushion, a seatback 22, and a headrest 24S1. As illustrated in FIG. 3 to FIG. 5, a head support section 38 is provided to the headrest 24S1 of the vehicle seat 10. The head support section 38 supports left and right locations corresponding to the occipital bone P2 of the head P1 of the seated occupant P so as to sandwich these locations from the left-right direction, and also supports a location corresponding to the occipital bone P2 of the head P1 of the seated occupant P in a forward direction and in an seat obliquely upward direction from the rear side. Note that the skull of a Deluxe Human Skeleton Model Sam with hanging stand (model no. A13) sold by Nihon 3B Scientific Inc. was employed when setting the shape, dimensions, and so on of the head support section 38.

Specifically, as illustrated in FIG. 3, the headrest 24S1 includes a headrest body 40 formed in a substantially rectangular block shape with a headrest stay disposed therein, and the head support section 38 that is integrally formed to the headrest body 40 at a front section of the headrest body 40. A left-right direction dimension of the headrest body 40 gradually decreases on progression toward the lower side. Thus, the headrest body 40 has an inverted, substantially trapezoidal shape as viewed from the front side.

The head support section 38 is formed of a pad made of a harder material than the headrest body 40. The head support section 38 includes a left side support portion 38AL and a right side support portion 38AR that project toward both the front side and oblique upper side from respective left and right sides of a lower side section of the headrest body 40. A projection amount of both the left side support portion 38AL and the right side support portion 38AR from the headrest body 40 is set so as to gradually increase on progression from the upper side toward the lower side, and then to gradually decrease on progression from an outermost projecting portion toward the lower side. A depression 38B that is open toward the front side and oblique upper side is formed in a front portion of the head support section 38. An inner face of the depression 38B has a substantially U-shaped curved profile as viewed from a direction orthogonal to an open direction of the depression 38B and the left-right direction. Note that portions of the inner face of the depression 38B configure faces of the left side support portion 38AL and the right side support portion 38AR at the sides of the head P1 (see FIG. 4 and FIG. 5) of the seated occupant P. Alternatively, the inner face of the depression 38B may be formed with a substantially V-shaped curved profile as viewed from a direction orthogonal to the open direction of the depression 38B and the left-right direction.

As illustrated in FIG. 3 to FIG. 5, when the occupant P is seated on the vehicle seat 10 and the head P1 of the seated occupant P is disposed inside the depression 38B of the head support section 38, the head P1 of the seated occupant P is suppressed from rocking in the left-right direction. Moreover, in a state in which the head P1 of the seated occupant P is disposed inside the depression 38B of the head support section 38, the left side support portion 38AL and the right side support portion 38AR overlap locations corresponding to the occipital bone P2 of the head P1 of the seated occupant P in the left-right direction in a seat side face view (as viewed from the left side or the right side). In addition thereto, in a state in which the head P1 of the seated occupant P is disposed inside the depression 38B of the head support section 38, the left side support portion 38AL and the right side support portion 38AR do not overlap the temporal region of the head P1 of the seated occupant P in the left-right direction in a seat side face view. Namely, the shape, dimensions, and so on of the head support section 38 are set such that, in a state in which the head P1 of the seated occupant P is disposed inside the depression 38B of the head support section 38, the head support section 38 only supports the head P1 of the seated occupant P further toward the rear side than the temporal region of the head P1. More specifically, the shape, dimensions, and so on of the head support section 38 are set such that, in a state in which the head P1 of the seated occupant P is disposed inside the depression 38B of the head support section 38, the head support section 38 only supports the head P1 of the seated occupant P further toward the rear side than the mastoid process P3. Moreover, the shape, dimensions, and hardness of the head support section 38 are set such that, in a state in which the head P1 of the seated occupant P is disposed inside the depression 38B of the head support section 38 and acceleration in a rightward direction has acted on the seated occupant P, contact pressure between the head support section 38 and a first location P4R corresponding to the occipital bone P2 of the head P1 of the seated occupant P increases. Furthermore, the shape, dimensions, and hardness of the head support section 38 are set such that, in a state in which the head P1 of the seated occupant P is disposed inside the depression 38B of the head support section 38 and acceleration in a leftward direction has acted on the seated occupant P, contact pressure between the head support section 38 and a second location P4L corresponding to the occipital bone P2 of the head P1 of the seated occupant P increases. Note that the first location P4R and the second location P4L are locations corresponding to respective left and right side parts at a lower end of the occipital bone P2. Note that the lower end of the occipital bone P2 is a part of the occipital bone P2 that is further toward the lower side than the superior nuchal line P5. Moreover, in a state in which the head P1 of the seated occupant P is facing toward the front, the first location P4R and the second location P4L are positioned at the same height. Moreover a left-right direction spacing between the first location P4R and the second location P4L is approximately 60 mm.

Operation and Advantageous Effects of Vehicle Seat 10 of Present Exemplary Embodiment Next, explanation follows regarding operation and advantageous effects of the vehicle seat 10 of the present exemplary embodiment.

Evaluation by Travel Sickness Evaluation Test

In order to confirm the operation and advantageous effects of the vehicle seat 10 of the present exemplary embodiment, the travel sickness evaluation test was performed on the vehicle seat 10 of the present exemplary embodiment and the vehicle seat 18 of the comparative example.

Figure 6:
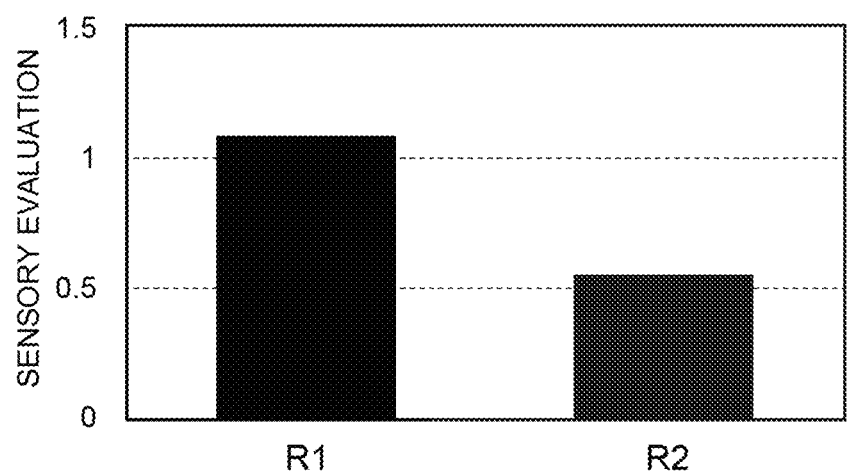
FIG. 6 is a graph illustrating results of a travel sickness evaluation test performed on a vehicle seat of a comparative example and a vehicle seat of an exemplary embodiment.

FIG. 6 illustrates results of the travel sickness evaluation test performed on the vehicle seat 10 of the present exemplary embodiment and the vehicle seat 18 of the comparative example (see FIG. 1). Note that during the travel sickness evaluation test, twelve people tested each of the two types of seats to give a total of twenty-four evaluations. The respective vehicle seat results illustrated in FIG. 6 are average values of the twenty-four travel sickness evaluation test results. Note that the reference numeral R1 is allocated to the results for the vehicle seat 18 of the comparative example, and the reference numeral R2 is allocated to the results for the vehicle seat 10 of the present exemplary embodiment.

As illustrated in FIG. 6, it is evident that the vehicle seat 10 of the present exemplary embodiment had a better travel sickness evaluation than the vehicle seat 18 of the comparative example. Note that determination regarding the evaluation was performed using the Wilcoxon test (statistically significant difference exists (1% significance level)).

As described above, it was confirmed in the travel sickness evaluation test of the vehicle seat 10 of the present exemplary embodiment that travel sickness of the seated occupant P could be alleviated.

Evaluation by Actual Vehicle Travel Test

Next, a travel test using an actual vehicle was performed on the vehicle seat 10 of the present exemplary embodiment. Note that this travel test using an actual vehicle is referred to as an actual vehicle travel test. This actual vehicle travel test was also performed on the vehicle seat 18 of the comparative example.

Figure 7:
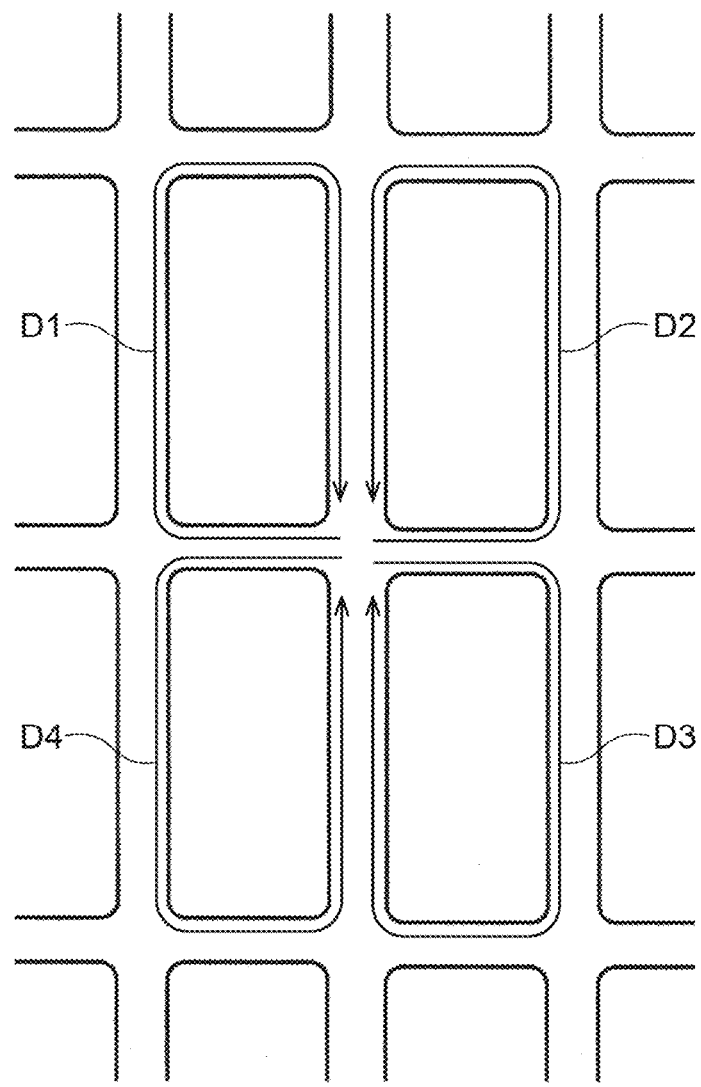
FIG. 7 is a diagram illustrating routes during an actual vehicle travel test.

The actual vehicle travel test was performed by repeatedly traveling in the sequence of the arrows D1 to D4 in the map illustrated in FIG. 7. Specifically, a travel sequence for the route indicated by the arrow D1 involved proceeding 50 m straight ahead, turning right, proceeding 160 m straight ahead, turning right, proceeding 50 m straight ahead, turning right, and proceeding 160 m straight ahead. Next, after turning left, the route indicated by the arrow D2 was traveled along. A travel sequence for the route indicated by the arrow D2 involved proceeding 50 m straight ahead, turning left, proceeding 160 m straight ahead, turning left, proceeding 50 m straight ahead, turning left, and proceeding 160 m straight ahead. Next, after turning left, the route indicated by the arrow D3 was traveled along. A travel sequence for the route indicated by the arrow D3 involved proceeding 50 m straight ahead, turning right, proceeding 160 m straight ahead, turning right, proceeding 50 m straight ahead, turning right, and proceeding 160 m straight ahead. Next, after turning left, the route indicated by the arrow D4 was traveled along. A travel sequence for the route indicated by the arrow D4 involved proceeding 50 m straight ahead, turning left, proceeding 160 m straight ahead, turning left, proceeding 50 m straight ahead, turning left, and proceeding 160 m straight ahead. Then, after turning left, travel along the routes indicated by the arrows D1 to D4 was repeated.

Figure 8:
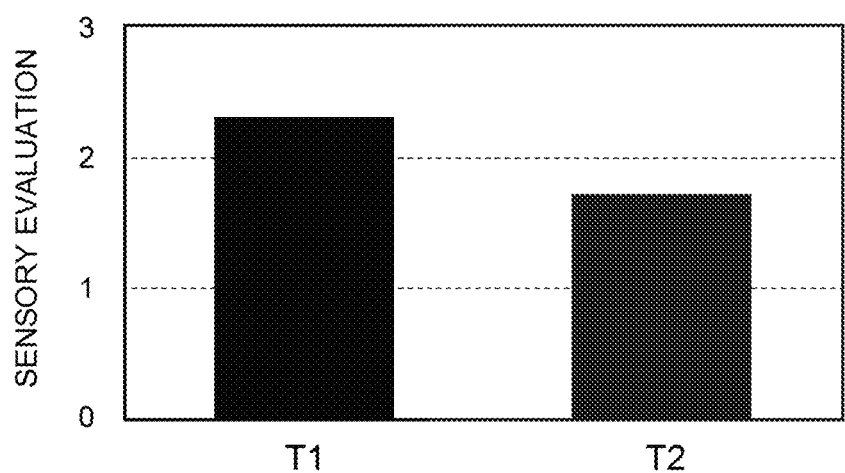
FIG. 8 is a graph illustrating results of an actual vehicle travel test performed using a vehicle seat of a comparative example and a vehicle seat of an exemplary embodiment.

FIG. 8 illustrates results of the actual vehicle travel test performed on the vehicle seat 10 of the present exemplary embodiment and the vehicle seat 18 of the comparative example (see FIG. 1). Note that during the actual vehicle travel test, eight people tested each of the two types of seats to give a total of sixteen evaluations. The respective vehicle seat results illustrated in FIG. 8 are average values of the sixteen actual vehicle travel test results. Note that the reference numeral T1 is allocated to the results for the vehicle seat 18 of the comparative example, and the reference numeral T2 is allocated to the results for the vehicle seat 10 of the present exemplary embodiment.

As illustrated in FIG. 8, it is evident that the vehicle seat 10 of the present exemplary embodiment had a more favorable travel sickness evaluation in the actual vehicle travel test than the vehicle seat 18 of the comparative example. Thus, the actual vehicle travel test also confirmed that the vehicle seat 10 of the present exemplary embodiment has an advantageous effect of alleviating travel sickness. Note that determination regarding the evaluation was performed using the Wilcoxon test (statistically significant difference exists (1% significance level)).

Summary of Operation and Advantageous Effects of Vehicle Seat 10 of Present Exemplary Embodiment Based on the above results, the vehicle seat 10 of the present exemplary embodiment enables travel sickness of a seated occupant to be effectively alleviated using a simple configuration in which the head support section 38 is provided to the headrest 24S1 as in the configuration described previously. Namely, occupant travel sickness can be suppressed while suppressing the configuration of the vehicle seat 10 from becoming complex.

Moreover, in the vehicle seat 10 of the present exemplary embodiment, in a state in which the head P1 of the seated occupant P is disposed inside the depression 38B of the head support section 38, the head support section 38 only supports the head P1 of the seated occupant P further toward the rear side than the temporal region. This enables excessive support of the head P1 in a side-on collision of the vehicle or the like to be suppressed. Namely, support of the head P1 by the head support section 38 can be withdrawn in cases in which the upper body of the seated occupant P is greatly offset from the seat center.

Furthermore, in the vehicle seat 10 of the present exemplary embodiment, in a state in which the head P1 of the seated occupant P is disposed inside the depression 38B of the head support section 38 and acceleration in the left-right direction has acted on the head P1, contact pressure increases at two locations (the first location P4R and the second location P4L) at the same height on the left and right of a location that corresponds to the occipital bone P2 of the head P1 of the seated occupant P. This enables the head P1 of the seated occupant P to be effectively suppressed from rocking, while suppressing dependence on the projection amounts of the left side support portion 38AL and the right side support portion 38AR.

Figure 9:
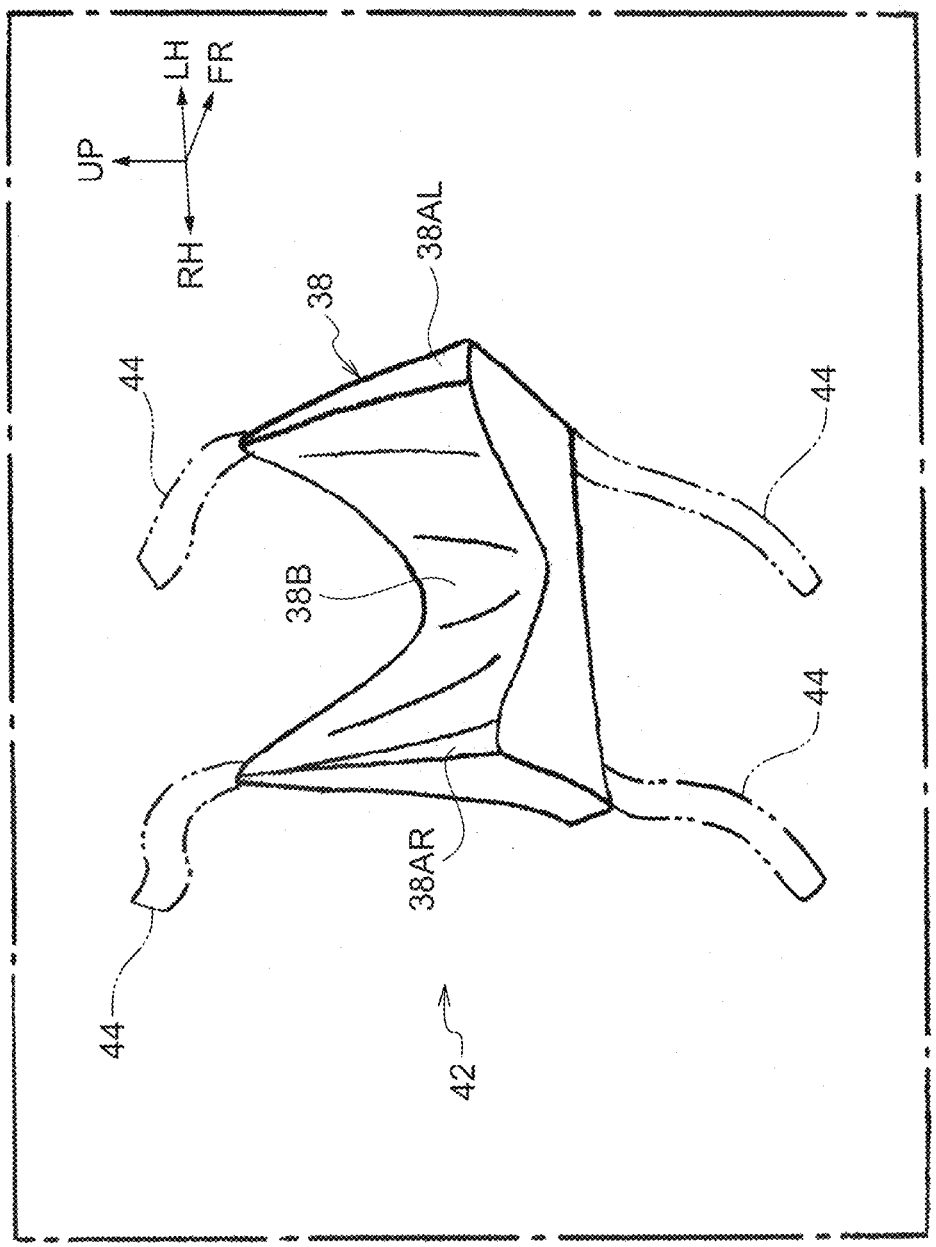
FIG. 9 is a perspective view illustrating a head support member.

Note that although an example has been described in which the head support section 38 is integrally formed to the headrest 24S1 in the vehicle seat 10 described above, the present disclosure is not limited to this configuration. For example, as illustrated in FIG. 9, similar advantageous effects to the vehicle seat 10 described above may be obtained by attaching and fixing a head support member 42 to a vehicle seat. The head support member 42 illustrated in FIG. 9 includes a head support section 38 with a similar configuration to that of the vehicle seat 10 of the present exemplary embodiment, and strap shaped attachment sections 44 that extend from the head support section 38. The strap shaped attachment sections 44 may be attached to a headrest, a headrest stay, a seatback, or the like. The head support member 42 is thereby fixed to the corresponding vehicle seat.

Configuration in which Head Support Section 38 can be Stowed Inside Headrest Body 40

Next, explanation follows regarding a configuration in which the head support section 38 can be stowed inside the headrest body 40 when the head support section 38 is not required. Note that the headrest 24S1 of the vehicle seat 10 of the exemplary embodiment described previously is referred to as the headrest 24S1 of a first exemplary embodiment. Moreover, two types of headrests 24S2, 24S3 described below are referred to as the headrest 24S2 of a second exemplary embodiment and the headrest 24S3 of a third exemplary embodiment. Moreover, members and portions of the headrest 24S2 of the second exemplary embodiment and the headrest 24S3 of the third exemplary embodiment that correspond to those of the headrest 24S1 of the first exemplary embodiment are allocated the reference numerals as the corresponding members and portions of the headrest 24S1 of the first exemplary embodiment, and explanation thereof is sometimes omitted.

Headrest 24S2 of Second Exemplary Embodiment

Figure 10:
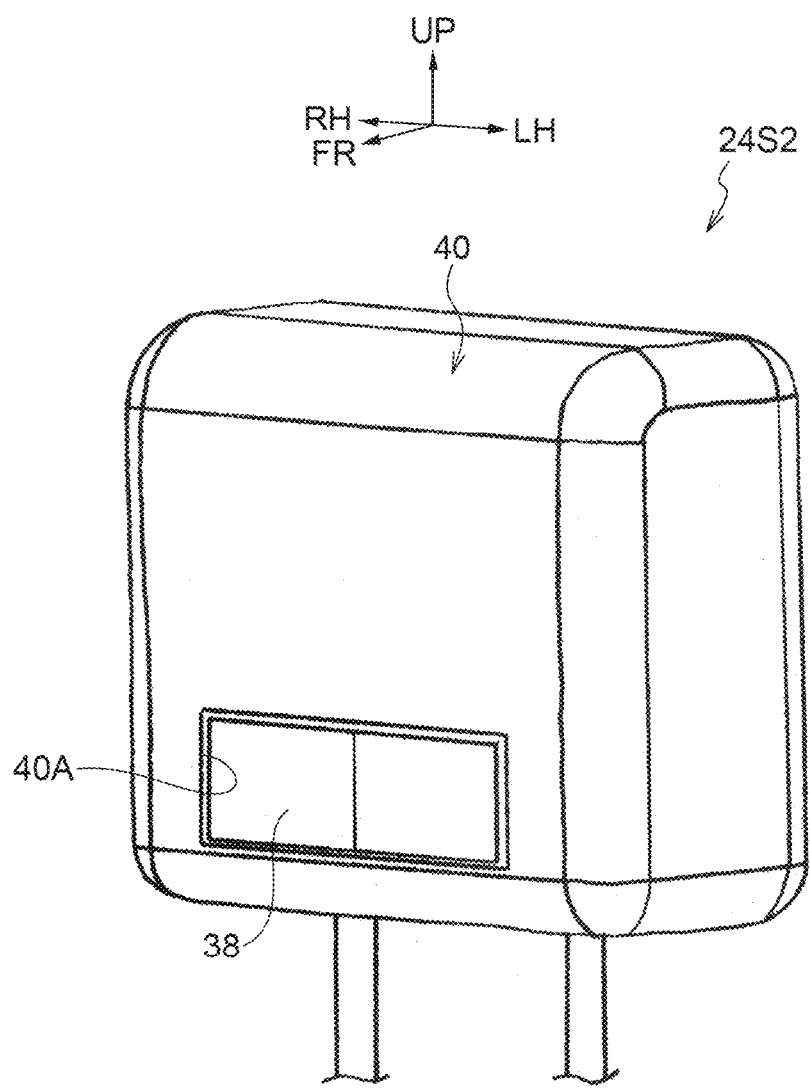
FIG. 10 is a perspective view illustrating a headrest of a second exemplary embodiment in a state in which a head support section is stowed.
Figure 11:
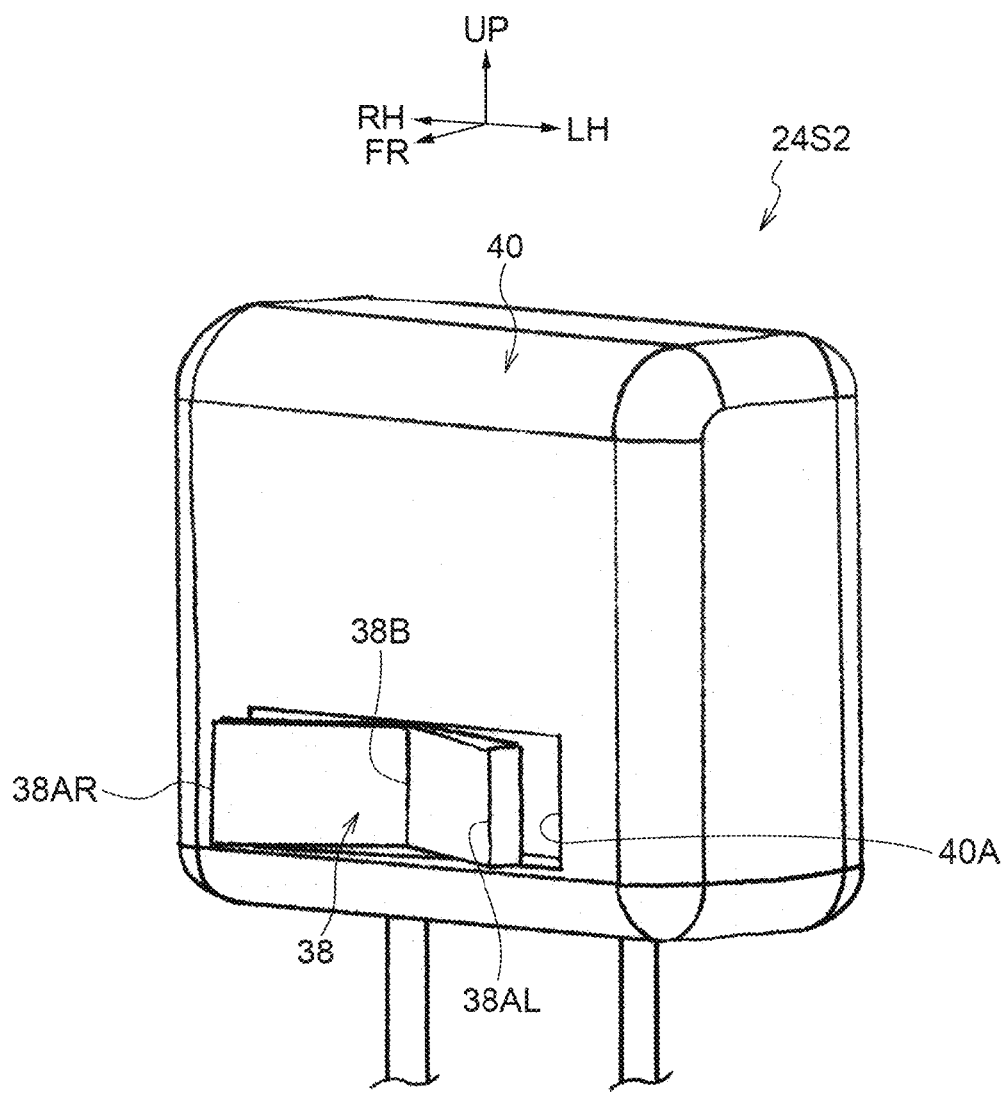
FIG. 11 is a perspective view illustrating a headrest of the second exemplary embodiment in a state in which part of a head support section has been pulled out from a headrest body.
Figure 12:
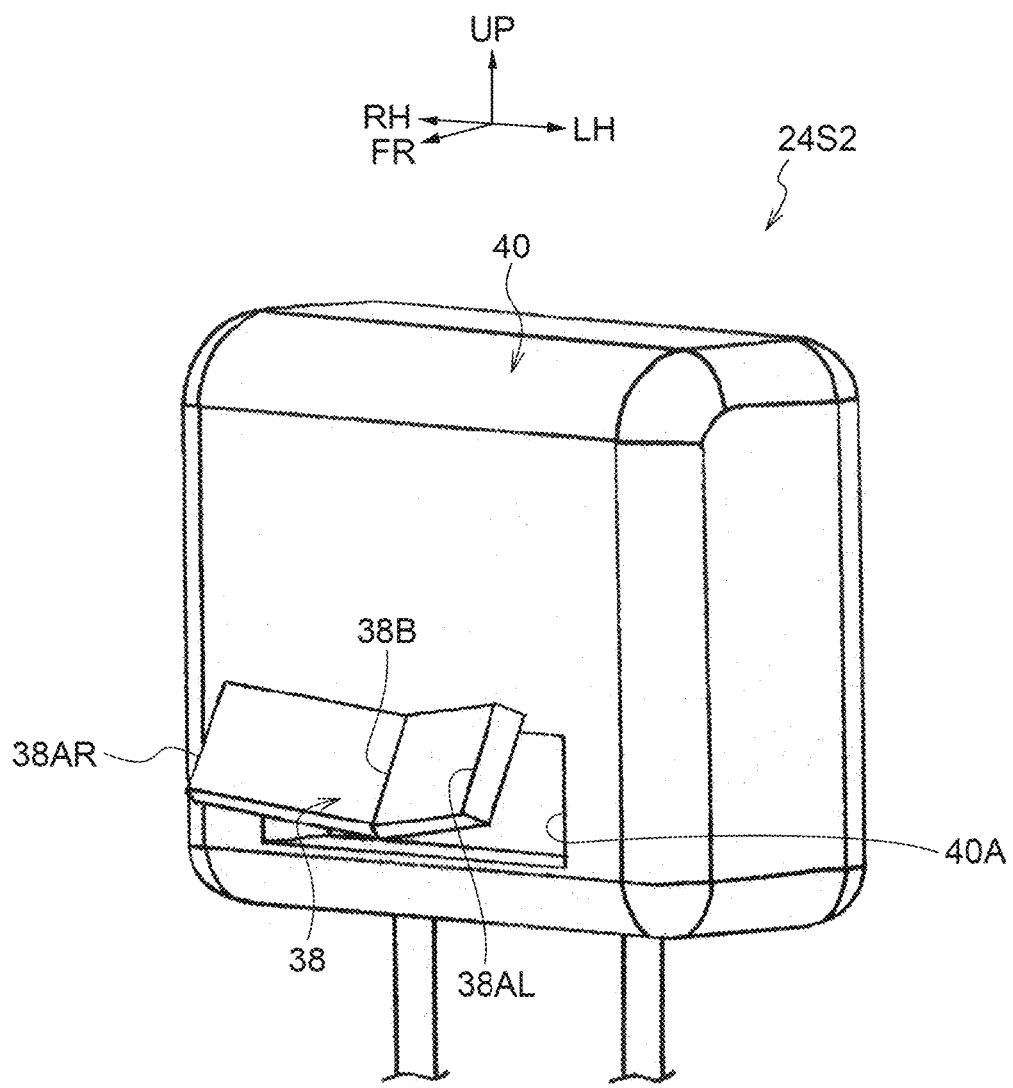
FIG. 12 is a perspective view illustrating a headrest of the second exemplary embodiment in a state in which a head support section is ready for use.

As illustrated in FIG. 10 to FIG. 12, the headrest 24S2 of the second exemplary embodiment includes a headrest body 40 and a head support section 38 that is supported by the headrest body 40 so as to be capable of tilting.

A recess shaped stowing section 40A that is open at the front side is formed in a left-right direction central portion of a lower end of the headrest body 40.

The head support section 38 is formed in a rectangular bodied shape with its length direction along the left-right direction. A left-right direction central portion of the head support section 38 is capable of being bent through a non-illustrated first hinge member. The head support section 38 is thereby capable of being bent into a substantially V shape that is open at the front side. The head support section 38 can be maintained in a V-shaped bent state by actuating a non-illustrated first stopper mechanism.

A non-illustrated second hinge member is provided between the head support section 38 and the headrest body 40. This enables the head support section 38 to be tilted in the front direction and the seat obliquely upward direction. The head support section 38 can be maintained in a state tilted in these directions by actuating a non-illustrated second stopper mechanism.

As illustrated in FIG. 10, in the headrest 24S2 of the second exemplary embodiment described above, the head support section 38 can be stowed inside the stowing section 40A of the headrest body 40. As illustrated in FIG. 11, when the head support section 38 is to be used, the head support section 38 is bent into a V shape by pulling out left and right end portions of the head support section 38 toward the front side from inside the stowing section 40A. Next, as illustrated in FIG. 12, the head support section 38 that has been bent into a V shape is tilted in the front direction and the seat obliquely upward direction. This enables the left side support portion 38AL and the right side support portion 38AR to be made to project out from the headrest body 40, enabling the head support section 38 to be placed in a state ready for use.

Headrest 24S3 of Third Exemplary Embodiment

Figure 13:
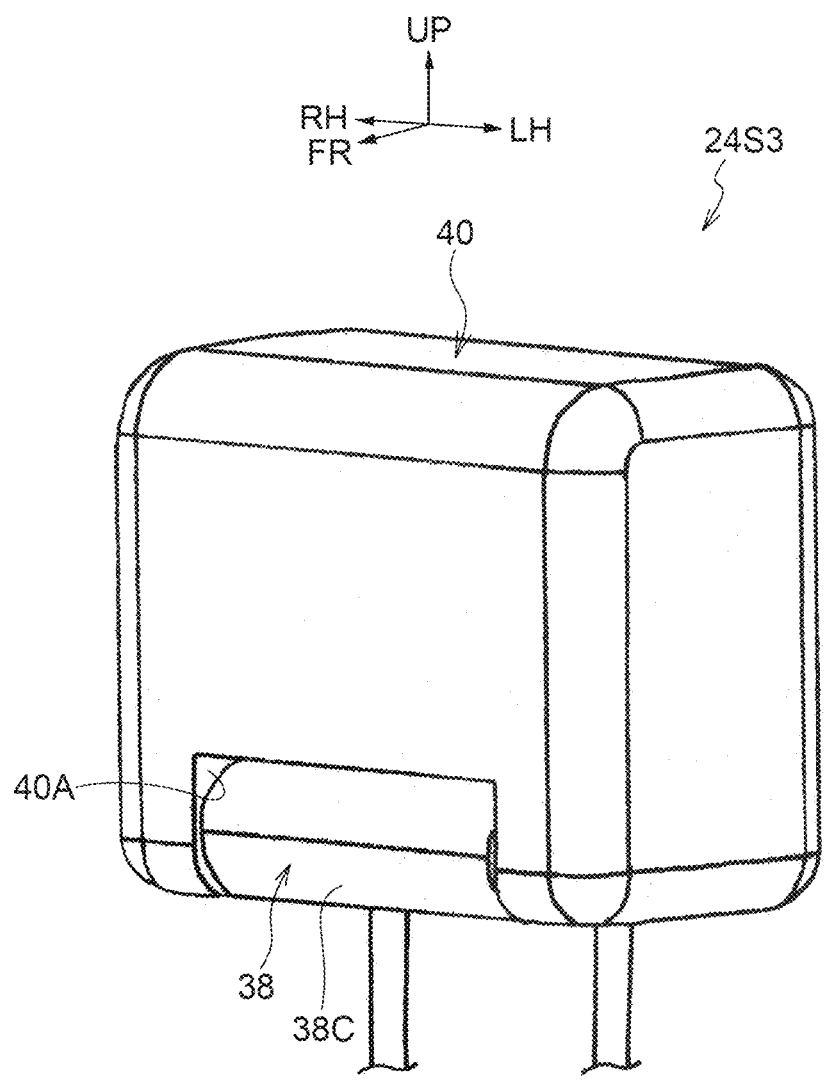
FIG. 13 is a perspective view illustrating a headrest of a third exemplary embodiment in a state in which a head support section is stowed.
Figure 14:
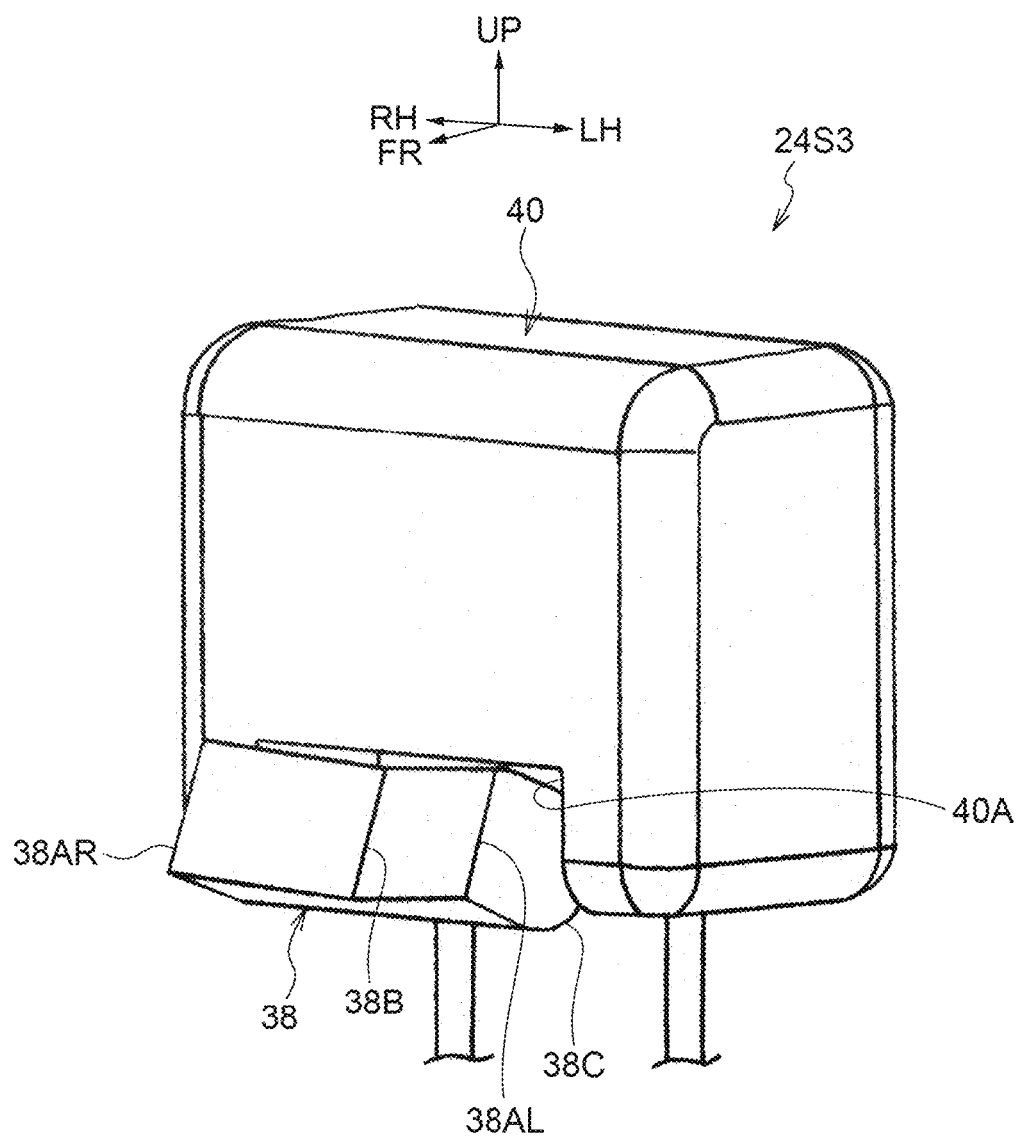
FIG. 14 is a perspective view illustrating a headrest of the third exemplary embodiment in a state in which a head support section is ready for use.

As illustrated in FIG. 13 and FIG. 14, the headrest 24S3 of the third exemplary embodiment includes a headrest body 40 and a head support section 38 that is supported by the headrest body 40 so as to be capable of rotating.

A recess shaped stowing section 40A that is open at the front side and lower side is formed in a left-right direction central portion of a lower end of the headrest body 40.

The head support section 38 is formed in a block shape with its length direction along the left-right direction. In a state in which most of the head support section 38 is disposed inside the stowing section 40A of the headrest body 40, the head support section 38 is supported by the headrest body 40 so as to be capable of rotating with its axial direction along the left-right direction. A depression 38B is formed in one rotation radial direction outside portion of the head support section 38. A portion of the head support section 38 on the opposite side to the side where the depression 38B is formed configures a curved section 38C that is curved in a rotation circumferential direction of the head support section 38.

As illustrated in FIG. 13, in the headrest 24S3 of the third exemplary embodiment described above, the head support section 38 can be stowed inside the stowing section 40A of the headrest body 40. Note that only the curved section 38C of the head support section 38 is visible in this state. As illustrated in FIG. 14, when the head support section 38 is to be used, the head support section 38 is rotated. This enables the left side support portion 38AL and the right side support portion 38AR to be made to project out from the headrest body 40, enabling the head support section 38 to be placed in a state ready for use.

Although exemplary embodiments of the present disclosure have been described above, the present disclosure is not limited to the above description, and obviously various other modifications may be implemented within a range not departing from the spirit of the present disclosure.

What is claimed is:

1. A vehicle seat comprising:
   a seat cushion configured so as to support buttocks of a seated occupant from a seat lower side;
   a seatback configured so as to support a back of the seated occupant from a seat rear side;

a headrest configured so as to support a head of the seated occupant from the seat rear side; and a head support section provided at the headrest, the head support section being configured to support a location corresponding an occipital bone of the head of the seated occupant from a seat left-right direction, and also being configured to support the location in a forward direction and in a seat obliquely upward direction from the seat rear side, wherein:

a head support section provided at the headrest, the head support section being configured to support a location corresponding an occipital bone of the head of the seated occupant from a seat left-right direction, and also being configured to support the location in a forward direction and in a seat obliquely upward direction from the seat rear side, wherein:

the head support section includes a left side support portion and a right side support portion that respectively project toward the head of the seated occupant from both left and right sides of a headrest body that supports the head of the seated occupant from the seat rear side, and that are configured to support a portion of the occipital bone of the head of the seated occupant that is further toward a lower side than a superior nuchal line and the head of the seated occupant further toward a rear side than a mastoid process so as to be sandwiched from the seat left-right direction, a depression that is open toward the head of the seated occupant is formed between the left side support portion and the right side support portion, and a face forming an inner side of the depression at the left side support portion and the right side support portion is formed in a V-shape as viewed from a direction orthogonal to an open direction of the depression and the seat left-right direction.

2. The vehicle seat of claim 1, wherein:

a shape and a dimension of the head support section are set such that contact pressure between the head support section and the first location corresponding to the occipital bone of the head of the seated occupant increases in a case in which acceleration in a seat rightward direction has acted on the seated occupant, and such that contact pressure between the head support section and the second location corresponding to the occipital bone of the head of the seated occupant and at a same height as the first location increases in a case in which acceleration in a seat leftward direction has acted on the seated occupant.

3. The vehicle seat of claim 1, wherein:

the headrest includes:

the headrest body, and the head support section supported by the headrest body; and the head support section is supported by the headrest body and is capable of being displaced between a state of being stowed in the headrest body and a state of projecting toward a seat front side with respect to the headrest body.

4. A headrest comprising:

a headrest body configured so as to support a head of a seated occupant from a seat rear side; and a head support section supported by the headrest body, the head support section being configured to support a location corresponding an occipital bone of the head of the seated occupant from a seat left-right direction, and also being configured to support the location in a forward direction and in a seat obliquely upward direction from the seat rear side, wherein:

the head support section includes a left side support portion and a right side support portion that respectively project toward the head of the seated occupant from both left and right sides of the headrest body, and that are configured to support a portion of the occipital bone of the head of the seated occupant that is further toward a lower side than a superior nuchal line and the head of the seated occupant further toward a rear side than a mastoid process so as to be sandwiched from the seat left-right direction, a depression that is open toward the head of the seated occupant is formed between the left side support portion and the right side support portion, and a face forming an inner side of the depression at the left side support portion and the right side support portion is formed in a V-shape as viewed from a direction orthogonal to an open direction of the depression and the seat left-right direction.

5. The vehicle seat of claim 1, wherein projection amounts of the left side support portion and the right side support portion from the headrest body gradually increase on progression from a seat upper side toward the seat lower side.

6. The vehicle seat of claim 2, wherein a seat left-right direction spacing between the first location and the second location is approximately 60 mm.

7. A head support member comprising:

an attachment section configured so as to be attached to a vehicle seat; and a head support section fixed to the vehicle seat by attaching the attachment section to the vehicle seat, the head support section being configured to support a location corresponding an occipital bone of a head of a seated occupant from a seat left-right direction, and also being configured to support the location in a forward direction and in a seat obliquely upward direction from a seat rear side, wherein:

the head support section includes a left side support portion and a right side support portion that respectively project toward the head of the seated occupant from both left and right sides of a headrest body that supports the head of the seated occupant from the seat rear side, and that are configured to support a portion of the occipital bone of the head of the seated occupant that is further toward a lower side than a superior nuchal line and the head of the seated occupant further toward a rear side than a mastoid process so as to be sandwiched from the seat left-right direction, a depression that is open toward the head of the seated occupant is formed between the left side support portion and the right side support portion, and a face forming an inner side of the depression at the left side support portion and the right side support portion is formed in a V-shape as viewed from a direction orthogonal to an open direction of the depression and the seat left-right direction.

* * * * *